United States Patent [19]

Engstrom et al.

[11] Patent Number: 4,793,292
[45] Date of Patent: Dec. 27, 1988

[54] CIRCULATING FLUIDIZED BED REACTOR

[75] Inventors: Folke Engstrom, San Diego, Calif.; Juhani Isaksson, Karhula, Finland

[73] Assignee: A. Ahlstrom Corporation, Karhula, Finland

[21] Appl. No.: 72,597

[22] Filed: Jul. 13, 1987

[51] Int. Cl.$^4$ ............................................. F22B 1/00
[52] U.S. Cl. .................................. 122/4 D; 55/269; 110/216; 110/245; 165/104.16
[58] Field of Search .............. 110/245, 216, 347, 345, 110/341; 122/4 D; 431/7, 170; 165/104.16; 55/269; 432/58

[56] References Cited

U.S. PATENT DOCUMENTS

| | | | |
|---|---|---|---|
| 4,161,389 | 7/1979 | Staffin et al. | 432/58 |
| 4,584,003 | 4/1986 | Oda et al. | 55/269 |
| 4,599,952 | 7/1986 | Meier | 110/216 |
| 4,615,283 | 10/1986 | Ciliberti et al. | 110/216 |
| 4,669,385 | 6/1987 | Brannstrom | 110/216 |

Primary Examiner—Edward G. Favors
Attorney, Agent, or Firm—Nixon and Vanderhye

[57] ABSTRACT

A circulating fluidized bed reactor includes a filter apparatus for separation and recycling of fine particles which are entrained by the flue gas. The housing of the filter apparatus has a plurality of vertically disposed ceramic filtration tubes. The reactor chamber and filter housing are arranged back-to-back and have a common wall therebetween. A pre-separator for separation of coarse particles is provided which connects the reactor chamber with the filter apparatus. The reactor, the separator and the filter apparatus are encased in a pressure-proof cylindrical vessel. The walls of the reactor chamber and the filter housing are water-cooled.

28 Claims, 4 Drawing Sheets

CIRCULATING FLUIDIZED BED REACTOR

BACKGROUND AND SUMMARY OF THE INVENTION

The present invention relates to a circulating fluidized bed reactor in which solid particles are separated from the flue gas and recycled to the reactor chamber. The invention may also be used in gasifiers.

In known circulating fluidized bed reactors, flue gas is removed from the upper end of the reactor chamber through a duct to a cyclone separator. Entrained ash, unburned solid fuel, and other relatively coarse particles, are separated from the hot flue gas and are returned to the lower part of the reactor chamber. Before the flue gas is discharged through a stack, it is passed through a dust collector of suitable design for removal of fine particles. Previously, the separation and collection of dust particles have been achieved by various apparatus which have required substantial space and multiple flow lines interconnecting their various elements. Integrating these various element and functions into a substantially compact system has not heretofore been achieved.

In accordance with the present invention, there is provided a reactor having integrated therewith in a single vessel vertical filtration tubes for separating solids from the solids-entrained gases. These tubes are made of porous super alloys or refractory material such as ceramic, and which tubes are disposed in a filter housing located in back-to-back relation with the reactor chamber. The filtration tubes are used to clean the flue gas.

Preferably, a pre-separator is located above the filter housing in direct communication with the flue gas discharge outlet. The pre-separator is thus located in back-to-back relation with the upper end of the reactor chamber. The pre-separator is used to separate relatively coarse particles from the flue gas and return them to the reactor chamber before the gas enters the filtration tubes. The smaller sized solid particles separate from the solids-entrained gas as the gas passes through the porous tubes. Such solids remain within the tubes along the inner walls thereof and are transported by the residual gas flow through the tubes for return to the reactor chamber. The structure and function of the filter apparatus which affords a thorough cleaning of the gas as it passes through the porous walls of the tubes ar-e described in U.S. Pat. No. 4,584,003, the disclosure of which is incorporated herein by reference.

Further, in accordance with the present invention, two different types of pre-separators may be used in keeping with the compact nature of the reactor hereof. In a first type, the filtration tubes project above an inclined wall into an area in communication with the flue gas discharge outlet. The upper ends of the tubes are partially closed. In this manner, the change of direction of the flue gas causes separation of the coarse particles which are deposited on an inclined wall forming the top of the filter housing for conveyance back to the reactor chamber. The gas with [the smaller size solids flows into the filtration tubes and through a plurality of compartments formed in the housing. Each compartment is connected with a clean gas outlet for flow out of the vessel.

In another form hereof, the pre-separator may comprise a cyclone separator disposed on top of the filter housing. An inlet duct is in communication with the gas discharge outlet for tangentially introducing gas into the cyclone separator. An inner tube of the separator extends upwardly into the cyclone and opens through an inclined wall into a chamber in communication with the filtration tubes. The solids fall onto the inclined wall for return to the reactor chamber, whereas the gas flows into the upwardly projecting tube for flow through and separation from the solids entrained therein by the filtration tubes.

From the foregoing, it will be appreciated that the reactor chamber and the filter housing, together with the pre-separator on top of the filter housing, lie in back-to-back relation one to the other, thereby affording a compact unitary vessel. In this manner, the combined and integrated reactor and filter housing may be enclosed within a pressurized vessel.

In another form of the present invention, a pair of filter housings may lie on opposite sides of the reactor chamber. Thus, each filter housing lies in back-to-back relation with the centralized reactor chamber and each may have a pre-separator of either of the foregoing described type. Each filter housing has outlet conduits for transporting the clean gas from the space between the filtration tubes and the housing externally to the vessel. The solids which are separated in the pre-separator fall by gravity along the incline wall into the central reactor chamber while the solids separated from the solids-entrained gas in the filtration tubes flows toward the base of the reactor chamber for return thereto.

In a further form of the present invention, whether the reactor chamber and filter housing lie in back to back relation or the filter housing straddles the reactor chamber, the coarse solids may be recirculated through discrete pipes which form part of the filter assembly. The coarse solids exiting the discrete filter assembly pipes may be recombined with the finer dust particles flowing through the other filter pipes for combined flow into the combustion chamber. Alternatively, the coarse and fine solids may be introduce into the combustion chamber separately.

In a preferred embodiment of the present invention, the reactor chamber and filter housing are enclosed in a pressure-proof vessel, preferably cylindrical. Also, the reactor is supplied with compressed air and the cleaned flue gas is used in a gas turbine. It will be further appreciated that the principles of the present invention can likewise be applied to a gasifier rather than a fluidized bed reactor.

In accordance with a specific preferred embodiment of the present invention, there is provided a circulating fluidized bed reactor comprising means defining an upright reactor chamber having at least one gas discharge opening against its upper end and at least one inlet opening for solids separated from the gas adjacent its lower end. There is also provided a housing and a plurality of generally vertically extending horizontally spaced filtration tubes in part formed of porous material and disposed in the housing. The housing and the reactor chamber are arranged in back-to-back relation one with the other, the housing having a gas inlet in communication with the gas discharge opening, a solids outlet in communication with the solids inlet opening and at least one clean gas outlet in communication with the space between the filtration tubes and the housing whereby gas flows through the porous material of the tubes into the space for communicating with the one clean gas outlet.

In a further aspect of the present invention, there is provided a method for separating solids entrained in a gas from a fluidized bed reactor comprising the steps of forming a plurality of filtration tubes of porous material, disposing the plurality of filtration tubes in a housing in spaced relation one to the other, disposing the housing in back-to-back relation with the reaction chamber, flowing the gas with entrained solids through a gas discharge opening in the reactor and into the filtration tubes for flow of the gas through the porous material into the space within the housing and between the tubes, removing the gas from the space and returning solids separated from the gas within the tubes to the reactor chamber.

Accordingly, it is a primary object of the present invention to provide a novel and improved compact circulating fluidized bed reactor design and particularly a circulating fluidized bed reactor design suited for use in pressurized combustion or other processes.

These and further objects and advantages of the present invention will become more apparent upon reference to the following specification, appended claims and drawings.

BRIEF DESCRIPTION OF THE DRAWING FIGURES

DETAILED DESCRIPTION OF THE DRAWING FIGURES

Reference will now be made in detail to the present and preferred embodiment of the invention, an example of which is illustrated in the accompanying drawings.

Figure 1:
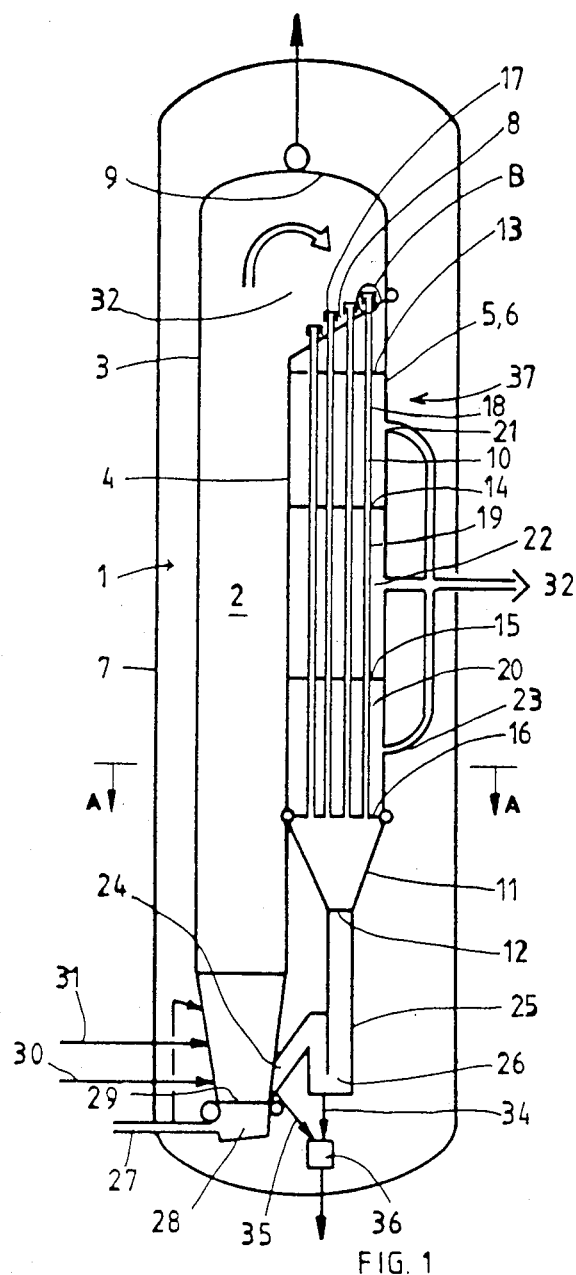
FIG. 1 is a schematic vertical cross-sectional view of a circulating fluidized bed reactor constructed in accordance with a preferred embodiment of the present invention.
Figure 2:
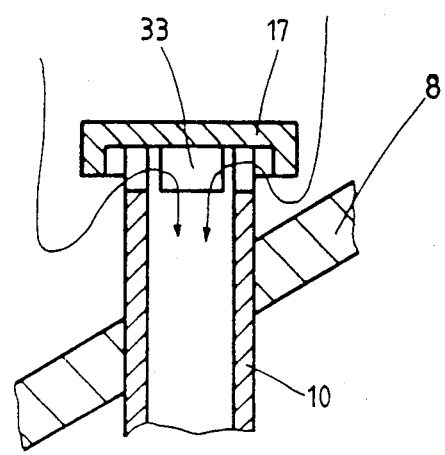
FIG. 2 is a fragmentary enlarged cross-sectional view of a portion of the pre-separator forming a part of the reactor illustrated in FIG. 1.

Referring now to the drawing figures, particularly to FIG. 1, there is illustrated a circulating fluidized bed reactor 1. Reactor 1 comprises a substantially vertical reactor chamber 2. The reactor chamber has a front wall 3 having a multi-sided angular shape, best illustrated in FIG. 3, and a planar rear wall. Front and rear walls 3 and , respectively, are water-cooled and are formed of vertically extending tubes in a conventional manner. A filter housing 5 is disposed in back-to-back relation to reactor chamber 2. The rear wall 4 of the reactor thus forms a wall of the filter housing. A semi-circular wall 6 having a multi-sided angular shape, similar to but reverse from wall 3, forms the remaining water-cooled wall of housing 5. Filter housing 5 includes a wall or plate B which closes the upper end of the housing. Wall 8 is disposed below the top wall 9 of reactor 1 and is inclined downwardly towards the reactor chamber. Wall 8 is provided with a plurality of openings and serves as a mounting plate for the upper end of a plurality of filtration tubes 10. As illustrated, tubes 10 are vertically disposed in housing 5. The lower end of housing 5 is provided with a generally funnel-shaped bottom part 11 having an outlet 12 through which solids are discharged from housing 5. The lower end of filtration tubes 10 are connected to a lower structural tube plate 16. Housing 5 is divided into a plurality of superposed compartments by intermediate tube sheets 13, 14 and 15. The upper ends of filtration tubes 10 protrude through the inclined plate 8 and the openings of the tubes are covered by caps 17, as illustrated in FIG. 2, to avoid direct access of the solids into the tubes. Openings 33 are formed in the sides of the upper ends of the tubes below caps 17 to enable entry of gas into the tubes and the tubes are therefore partially closed at their upper ends.

Tubes 10 are formed of sintered ceramic material and are porous except for the upper portion between the tube plates 8 and 13. The tubes at that location are not permeable to gas. Compartment 18, 19 and 20 between the tube sheets 13–16 are provided with gas outlets 21, 22 and 23, respectively.

An inlet opening 24 for recycled solids is provided in the lower part of the reactor chamber. A standpipe 25 and a loop seal 26 connect the outlet 12 in the bottom part of the filter housing with the solids inlet opening 24 in the reactor chamber.

Air from a conduit 27 connected to an air plenum 28 below a grid 29 supplies compressed air from an external source to the plenum. Feeders shown schematically by the reference numerals 30 and 31 are adapted to feed fuel, such as coal, and additives, such as limestone, into the reactor chamber above grid 29.

The flue gas with entrained solids leaves reactor chamber 2 through an opening 32 formed between its top wall g and the inclined upper tube plate . The gas then flows into filtration tubes 10. When flowing into tubes 10, the gas flows through openings 33 below cap 17, and abruptly changes direction, which causes separation of the coarse fraction of the solids from the gas. These coarse solids collect on the inclined tube plate 8, slide down along the surface of the plate under the influence of gravity, and fall down into the reaction chamber along the rear wall 4.

A portion of the flue gas, which after having entered the filtration tubes for flow in a downward direction therealong, passes through the porous tube walls in the first gas compartment 18 while the solids remain along the inside of the tubes.

Another portion of the flue gas passes through the porous tube walls in the second gas compartment 19. Remaining portions of the flue gas pass through the porous tube walls in the third gas compartment 20. The gas in the space between the exterior of the tubes and the interior of the filter housing compartments is removed through clear gas outlets 21, 22 and 23 and transferred through a conduit 32 to a gas turbine, not shown.

The fine particles which are separated from the gas fall down or are moved by the downward flow of the gas or coarser particles to the bottom part of the filter housing and are discharged through the solids outlet 12. The solids are returned to reactor chamber 2 through standpipe 25 and the loop seal 26. Particulate material which mainly consists of ash can be removed from the loop seal or the lower end of the reactor chamber through conduits 34 and 35. The material removed is cooled in an ash cooler 36.

The entire reactor chamber 2, filter apparatus 37, standpipe 25, loop seal 26 and the ash cooler 36 30 are encased by and within a pressure-proof vessel 7. The vessel is pressurized by the same air which is introduced into the reactor chamber. As the inner and outer pressures acting on these parts are equal, they do not have to be pressure-proof. Also, the walls of the filter housing 10 are formed of water wall tubes, thereby affording a high heat resistance.

Figure 4:
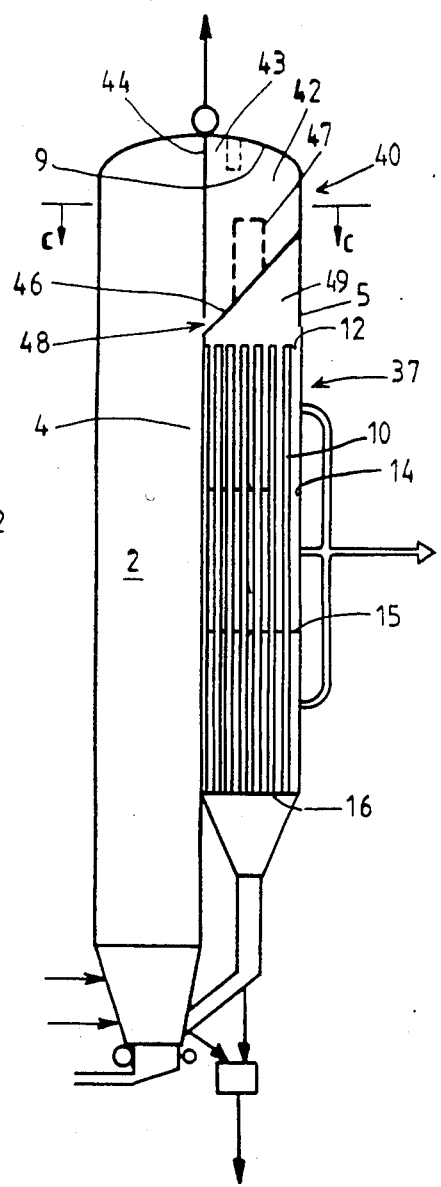
FIG. 4 is a view similar to FIG. 1, illustrating a further embodiment of the present invention.
Figure 3:
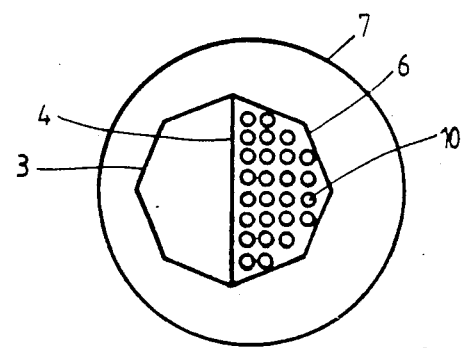
FIG. 3 is a cross-sectional view of th reactor taken generally about on line A—A in FIG. 1.
Figure 5:
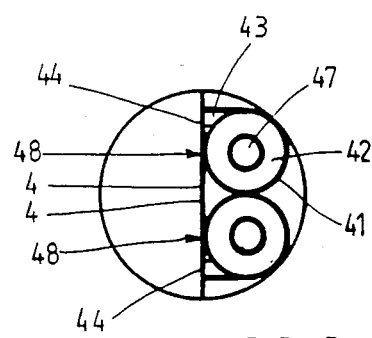
FIG. 5 is a cross-sectional view thereof taken generally about on line C—C in FIG. 4.

FIGS. 4 and 5 illustrate another embodiment of the invention which is generally similar in structure and operation to the embodiment shown in FIGS. 1 through 3. Only those structural and operational features which serve to distinguish this embodiment from that shown in FIGS. 1 through 3 will be described below. The same reference numerals have been used in FIGS. 4 and 5 to identify elements identical or substantially identical to those depicted in FIGS. 1 through 3.

The embodiment of the invention shown in FIGS. 4 and 5 includes a filter housing 5 and a reactor chamber 2 disposed in back-to-back relation one with the other. The walls of the reactor chamber and the filter housing form a vessel having a cylindrical cross-section, as best illustrated in FIG. 5. Two parallel cyclone separators 40 are mounted on the filter housing which operatively connect the reactor chamber with the filter apparatus 37. Each cyclone separator comprises a circumferential wall 41 defining an annular separator chamber 42. A gas inlet duct 43 is tangentially connected to each separator chamber. The inlet ducts 43 of the separators are connected to two discharge openings 44 formed in the rear wall 4 of the reactor chamber for discharging as from the reactor chamber. The upper end of separator chambers 43 are closed by top wall 9. An inclined wall or plate 46 mounted on the filter housing forms the bottoms of the separator chambers. A central pipe 47 extends into each separator channel and is connected to the bottom. An opening 48 in the circumferential wall of the separator chamber and rear wall 4 located near the bottom of the separators forms an outlet for separated solid material. A plurality of parallel filtration tubes 10 are disposed vertically in the filter housing. The ends of the tubes are connected to an upper tube sheet 12 forming structural connections for supporting the tubes 10. Additional intermediate tube sheets 14 and 15 divide the filter housing into compartments. The top part of the filter housing below inclined wall or plate 46 forms an inlet chamber 49 which distributes the gas from the cyclone separator to the filtration tubes 10.

In operation, the flue gas with entrained solids is discharged through the reactor chamber gas discharge openings 44 at the upper end of the reactor chamber. A coarse fraction of the solids material is separated at the periphery of the separator chamber and falls down to the bottom wall 46 of the chamber. The material collected on bottom wall 46 slides down its inclined surface under the influence of gravity and falls down into the reactor chamber through the solids opening 48.

Gas, from which the coarse particles have been separated, is discharged from the separation chambers 42 through gas outlet pipes 47 to inlet chamber 49 of the filter apparatus which distributes the gas to the filtration pipes. The gas flows through the porous filtration pipes for collection external to the apparatus, with the smaller sized particles being returned with a portion of the gas to the reaction chamber, as previously described in connection with the embodiment of FIGS. 1 through 3.

Referring now to the embodiment of the invention hereof illustrated in FIGS. 6 and 7, which is generally similar in structure and operation to the embodiments of FIGS. 1-3 and 4-5, only those structural and operational features which serve to distinguish this embodiment from the other embodiments will be described below. Similar reference numerals are used in FIGS. 6 and 7 as used in FIGS. 1-3 to identify identical or substantially identical elements.

Figure 6:
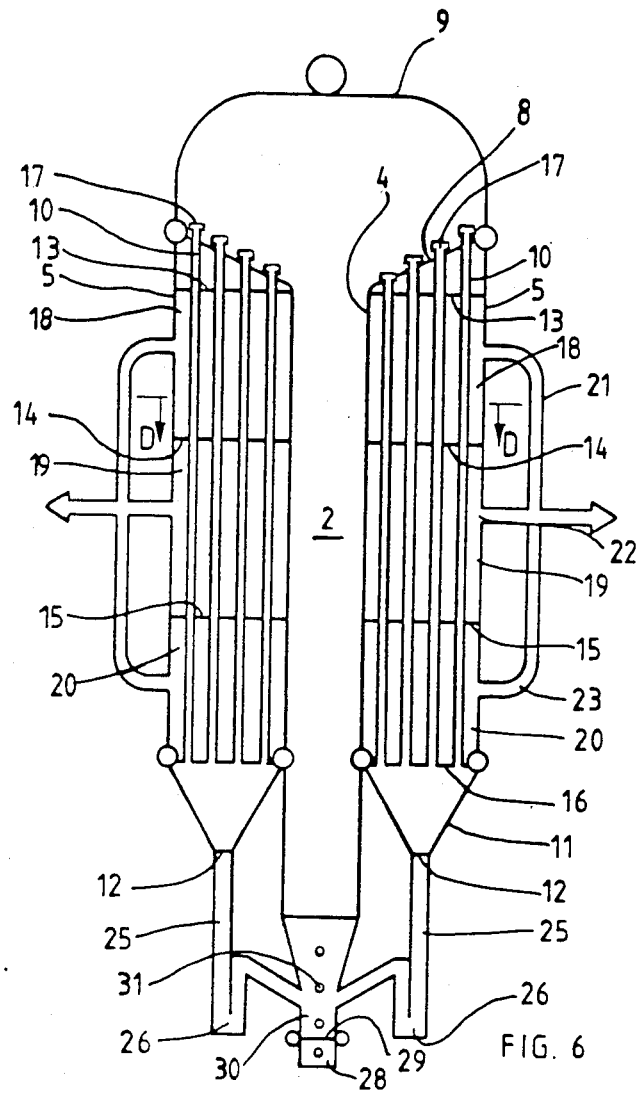
FIG. 6 is a view similar to FIG. 1, illustrating a still further embodiment of the present invention.
Figure 7:
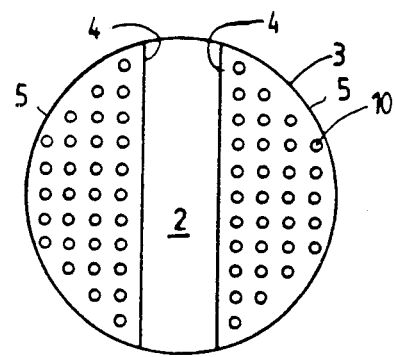
FIG. 7 is a cross-sectional view thereof taken generally about on line D—D in FIG. 6.

In FIG. 6, the reactor chamber 2 is illustrated as a central chamber or column which has a lower grid 29 to which feeders 30 and 31 feed coal or other fuels for burning in the chamber. Below grid 29, there is provided a plenum 28 and the upper portion of reactor chamber 2 is closed by a wall 9.

In accordance with this embodiment of the present invention, disposed on opposite sides of the reactor chamber 2 are a pair of filtration housings 5, which are identical in construction and mirror-images of one another. Each filtration housing 5 has a plurality of upstanding filtration tubes 10 supported at their upper ends by inclined wall or plate 8, the upper ends of which tubes 10 are closed by cap 17 in the manner illustrated in FIG. 2. The filtration housings 5 are separated into discrete superposed compartments 18, 19 and 20, separated by plate 13, 14, 15 and 16. The space about the filtration tubes 10 and within housing 5 communicates with a clean gas outlet 21, 22 and 23. The lower portions of the filtration housings 5 communicate with the reactor chamber through a bottom part 11 with outlet 12, which in turn communicate with the chamber through the standpipe 25 and loop seal 26.

The operation of this form of the invention is similar to that described with respect to the previous embodiments. Importantly, the filtration housings are disposed in a straddling relation to the reactor chamber 2, with each filtration housing lying in back-to-back relation with the reactor chamber 2. In this manner, a compact housing is provided for the entirety of the apparatus.

Referring now to the embodiment of the invention hereof illustrated in FIGS. 8 and 9, which is generally similar in structure and operation to the embodiments of FIGS. 1-3 and 4-5, only those structural and operational features which serve to distinguish this embodiment from the other embodiments will be described below. Similar reference numerals are used in FIGS. 8 and 9 as used in FIGS. 1-3 to identify identical or substantially identical elements.

Figure 8:
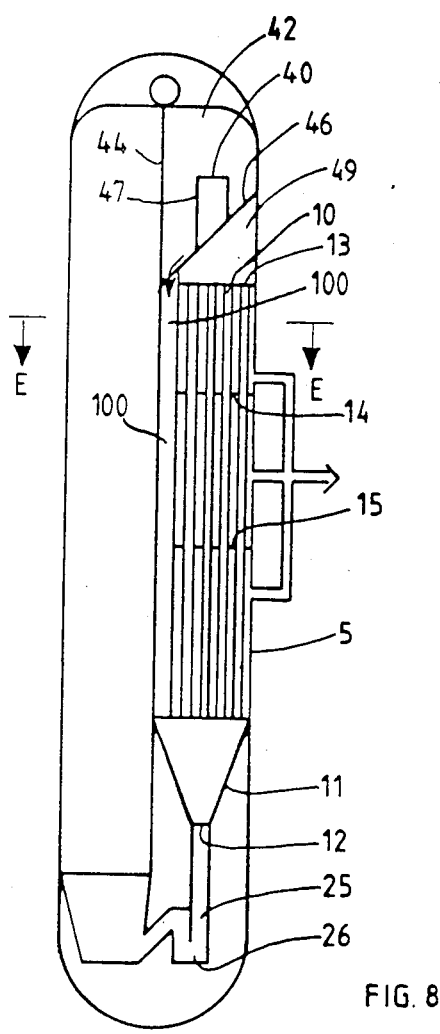
FIG. 8 is a view still another embodiment of the present invention.
Figure 9:
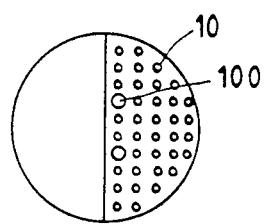
FIG. 9 is a cross sectional view thereof taken generally about on line E—E in FIG. 8.

In FIG. 8, the reactor chamber and filter housing 5 are arranged in back to back relation similar as the embodiments of FIGS. 1-3 and 4-5. The cyclone separators 40 mounted on top of inclined wall 46 are structurally and operationally similar to the cyclones of the embodiment of FIG. 4. In this embodiment, the inclined wall of plate 46 mounted on the filter housing forms the bottoms of the separator chambers. A plurality of parallel filtration tubes 10 are disposed vertically in the filter housing similarly as in the previous embodiment of FIGS. 4-5 except that a pair of enlarged diameter or area tubes 100 formed of similar porous material as the remaining tubes 10 extend the full length of the housing. The upper ends of the tubes 10 and 100 are connected to an upper tube sheet 13 forming structural connections for supporting the tubes 10. Additional intermediate tube sheets 14 and 15 divide the filter housing into compartments. The top part of the filter housing below inclined wall or plate 46 forms an inlet chamber 49 which distributes the gas from the cyclone separator to the filtration tubes 10. The upper ends of the enlarged area tubes 100 open through the inclined wall 46 to receive the coarse solids sliding down wall 46. The lower ends of tubes 10 and 100 exit into a common hopper 11 with an outlet 12 which, in turn, communicates with the chamber through standpipes 25 and loop seal 26.

In operation, the flue gas with entrained solids is discharged through the reactor chamber gas discharge openings 44 at the upper end of the reactor chamber. A coarse fraction of the solids material is separated at the periphery of the separator chamber and falls down to the bottom wall 46 of the chamber. The material collected on inclined wall 46 slides down its inclined surface under the influence of gravity into the upper open ends of filtration tubes 100.

Gas, from which the coarse particles have been separated, is discharged from the separation chambers 42 through gas outlet pipes 47 to inlet chamber 49 of the filter apparatus which distributes the gas to the filtration pipes 10. The gas flows through the porous filtration pipes 10 and 100 for collection external to the apparatus, with both the smaller and larger sized particles being returned with a portion of the gas to the reaction chamber through the hopper 11, outlet 12, standpipe 25 and loop seal 26. Alternatively, the coarse and fine solids can be introduced into the combustion chamber separately.

It will be appreciated with respect to both the embodiments illustrated in FIGS. 4–5, 6–7 and 8–9 that the apparatus may be enclosed within a pressure vessel similar to the vessel illustrated with respect to the embodiment of FIG. 1.

It will also be appreciated that the invention can be carried out without any pre-separator which separates the coarse fraction from the gas. Consequently, the pre-separators, whether they be cyclone separators as in the embodiments of FIGS. 4–5 or the capped filtration tube arrangement illustrated in the embodiment of FIGS. 1–3, may be eliminated and the coarse material may flow through the filtration tubes, scouring the filtration surfaces, thus keeping the filtration tubes clean.

It will be appreciated that the objects of the present invention are fully accomplished in that there has been provided a circulating fluidized bed reactor which is compact in construction and capable of use within a pressurized vessel.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A circulating fluidized bed reactor, comprising:
   means defining an upright reactor chamber having at least one gas discharge opening adjacent its upper end and at least one inlet opening for solids separated from the gas adjacent it lower end;
   a housing;
   a plurality of generally vertically extending horizontally spaced filtration tubes in part formed of porous material and disposed in said housing;
   said filter housing and said reactor chamber being arranged in back-to-back relation one with the other, said housing having a gas inlet in communication with said gas discharge opening, a solids outlet in communication with said solids inlet opening and at least one clean gas outlet in communication with the space between said filtration tubes an said housing whereby gas flows through the porous material of said tubes into said space for communicating with said one clean gas outlet.

2. A reactor according to claim 1 including separating means connecting said gas discharge opening and said gas inlet for separating solids and gases upstream of said housing.

3. A reactor according to claim 2 wherein said separating means comprises a wall inclined towards the reactor chamber for returning separated solids to the reactor.

4. A reactor according to claim 2 wherein said separating means comprises at least one cyclone separator having a separator chamber, said gas inlet including a duct in communication with said gas discharge opening, a solids outlet in the lower part of said cyclone chamber in communication with the reactor chamber and a gas outlet pipe extending into said cyclone chamber, said cyclone chamber having a bottom to which said gas outlet pipe is connected.

5. A reactor according to claim 4 wherein said bottom is inclined towards the reactor chamber.

6. A reactor according to claim 1 including a standpipe and a loop seal connecting said solids outlet and said solids inlet opening.

7. A reactor according to claim 6 wherein the reactor chamber, the filter housing, the standpipe and the loop seal are encased in a pressurized vessel.

8. A reactor according to claim 7 wherein said vessel is cylindrical.

9. A reactor according to claim 1 including means for water cooling at least a portion of the walls of the reactor chamber and said filter housing.

10. A reactor according to claim 1 including separating means connecting said gas discharge opening and said gas inlet for separating solids and gases upstream of said housing, said separating means including a wall inclined towards the reactor chamber for returning solids to the reactor, said filtration tubes extending upwardly to project above said inclined wall, means for partially closing end portions of said upwardly projecting tubes for separating coarse solids from the gas for deposition on said inclined wall and return to said reactor and enabling gas having smaller sized solids entrained therein to flow into said tubes.

11. A reactor according to claim 1 wherein said filter housing is disposed on one side of said reactor chamber, said reactor chamber having a second inlet opening for solids separated from the gas adjacent its lower end, a second filter housing having a plurality of generally vertically extending horizontally spaced filtration tubes in part formed of porous material and disposed in said second housing, said second filter housing and said reaction chamber being arranged in back-to-back relation one with the other on the opposite side of said reactor from said first filter housing, said second filter housing and said reactor chamber being arranged in back-to-back relation one with the other, said second housing having a gas inlet in communication with said gas discharge opening, a solids outlet in communication with said second solids inlet opening and at least one clean gas outlet in communication with the space between said filtration tubes and said second housing whereby gas flows through the porous material of the latter tubes into said space for communicating with said one clean gas outlet of said second housing.

12. A reactor according to claim 11 including a pair of separating means connecting said gas discharge opening and said gas inlets for said first and second housings, respectively for separating solids and gases upstream of said housings, each of said separating means including a wall inclined towards the reactor chamber for returning solids to the reactor, said filtration tubes of each housing extending upwardly to project above the inclined wall thereof, and means for partially closing end portions of said upwardly projecting tubes for separating coarse solids from the gas for deposition on said inclined walls and return to said reactor and enabling gas having smaller sized solids entrained therein to flow into said tubes.

13. A reactor according to claim 11 including a pair of separating means connecting said gas discharge opening and said gas inlets for said first and second housings, respectively, for separating solids and gases upstream of said housings, said separating means each comprising at least one cyclone separator having a separator chamber, said gas inlet including a duct in communication with said gas discharge opening, a solids outlet in the lower part of said cyclone chamber in communication with the reactor chamber and a gas outlet pipe extending into said cyclone chamber, said cyclone chamber having a bottom to which said gas outlet pipe is connected.

14. Apparatus according to claim 1 wherein said housing includes a plurality of superposed compartments through which said filtration tubes extend, said compartments defining said space from receiving the gas flowing through said porous tubes and in communication with said on clean gas outlet.

15. Apparatus according to claim 1 including a pressure vessel, said reactor chamber and said filtration housing being disposed within said pressure vessel for operation at a pressure other than atmospheric.

16. Apparatus according to claim 1 including separating means carried by said filter housing for separating solids into coarse and fine solids flow streams through said filter housing, said separating means including at least one filtration tube having a large cross sectional area for receiving the coarse solids in comparison with at least another filtration tube having a small cross sectional area for receiving the fine solids.

17. Apparatus according to claim 16 wherein said coarse and fine filtration tubes open at their downstream ends in communication with said solids inlet.

18. A circulating fluidized bed reactor, comprising:
means defining an upright reactor chamber having at least one gas discharge opening adjacent its upper end and at least one inlet opening for solids separated from the gas adjacent its lower end;
a housing;
a plurality of generally vertically extending horizontally spaced filtration tubes in part formed of porous material and disposed in said housing;
means defining a chamber about each said tube for receiving gas flowing through the porous material of said tubes;
said filter housing and said reactor chamber being arranged in back-to-back relation one with the other, said housing having a gas inlet in communication with said gas discharge opening, a solids outlet in communication with said solids inlet opening and at least one clean gas outlet in communication with said chamber defining means, whereby gas flows through the porous material of said tubes into said chamber for communicating with said one clean gas outlet.

19. A reactor according to claim 1B including separating means connecting said gas discharge opening and said gas inlet for separating solids and gases upstream of said housing.

20. A reactor according to claim 18, including a pressure vessel, said reactor chamber and said filtration housing being disposed within said pressure vessel for operation at a pressure other than atmospheric.

21. A method for separating solids entrained in a gas from a fluidized bed reactor comprising the steps of:
forming a plurality of filtration tubes of porous material;
disposing said plurality of filtration tubes in a housing in spaced relation one to the other;
disposing said housing in back-to-back relation with said reaction chamber;
flowing the gas with entrained solids through a gas discharge opening in the reactor and into the filtration tubes for flow of the gas through the porous material into the space within the housing and between the tubes;
removing the gas from the space; and
returning solids separated from the gas within the tubes to said reactor chamber.

22. A method according to claim 21 including the step of separating the coarse solids from the solids entrained gas prior to flowing the gas into the filtration tubes.

23. A method according to claim 22 wherein said reactor chamber and said housing are vertically elongated and form part of a single vessel, wherein the step of returning the solids to said reactor chamber includes flowing the separated solids by gravity along a wall disposed adjacent the top of said housing.

24. A method according to claim 22 wherein the step of separating includes flowing the gas tangentially into a cyclone separator.

25. A method according to claim 24 wherein said reactor chamber and said housing are vertically elongated and form part of a single vessel, wherein the step of returning the solids to said reactor chamber includes flowing the separated solids by gravity along a wall disposed adjacent the top of said housing and forming the bottom of the cyclone separator.

26. A method according to claim 21 including the step of enclosing said reactor chamber and said housing within a pressure vessel for operating said reactor at a pressure other than atmospheric pressure.

27. A method according to claim 21 including the steps of flowing the coarse solids through at least one filtration tube of said housing and flowing the finer solids through the other filtration tubes of said housing.

28. A method according to claim 27 wherein the step of returning the solids to the reactor chamber includes recombining the coarse and fine solids after flow through the filtration tubes for combined return to the reaction chamber.

* * * * *